Nov. 18, 1969   F. H. WILLIAMS   3,479,013
CONNECTOR MEANS FOR FISH TAPES OR THE LIKE
Original Filed Nov. 21, 1962   4 Sheets-Sheet 1

INVENTOR.
FRANK H. WILLIAMS
BY *Milford A. Juster*
ATTORNEY

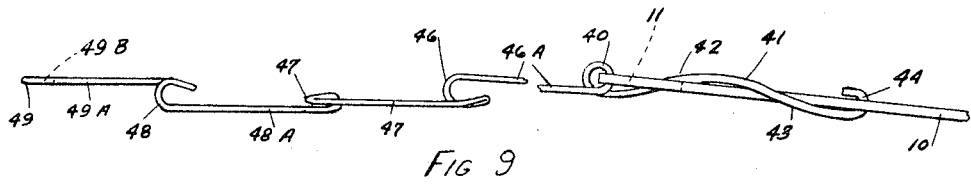
FIG 9
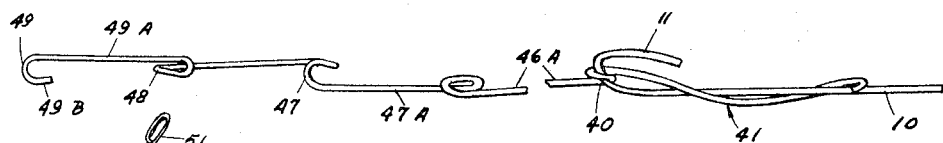
FIG 10
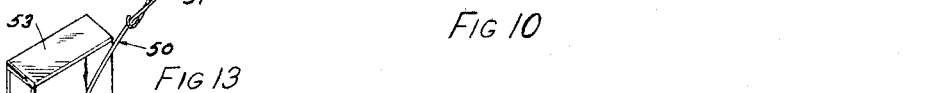
FIG 11
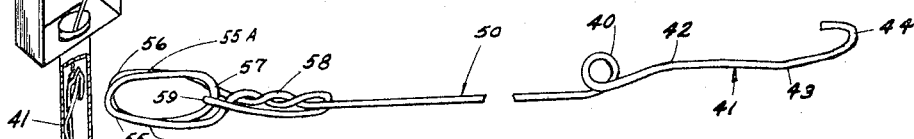
FIG 12
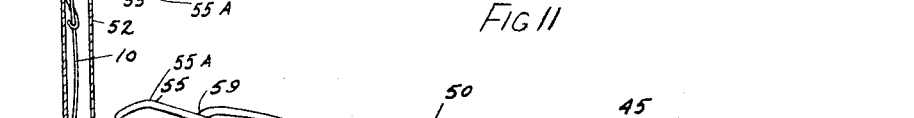
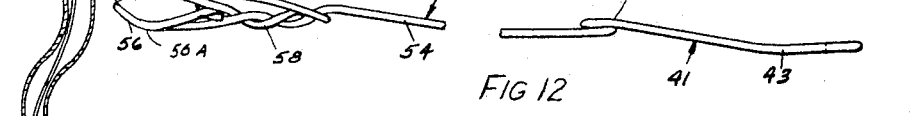
FIG 14
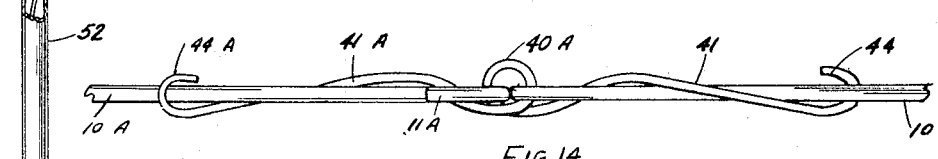
FIG 15
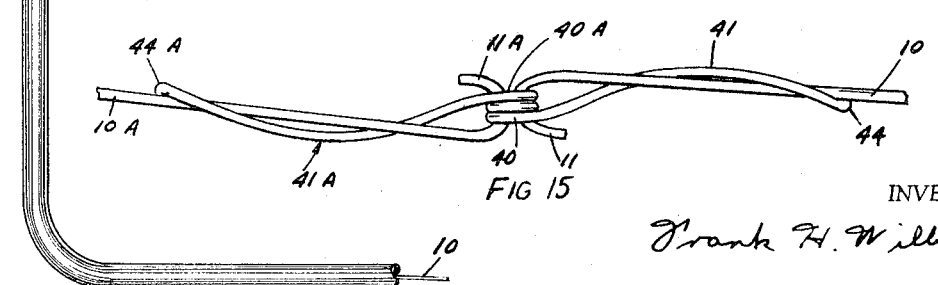

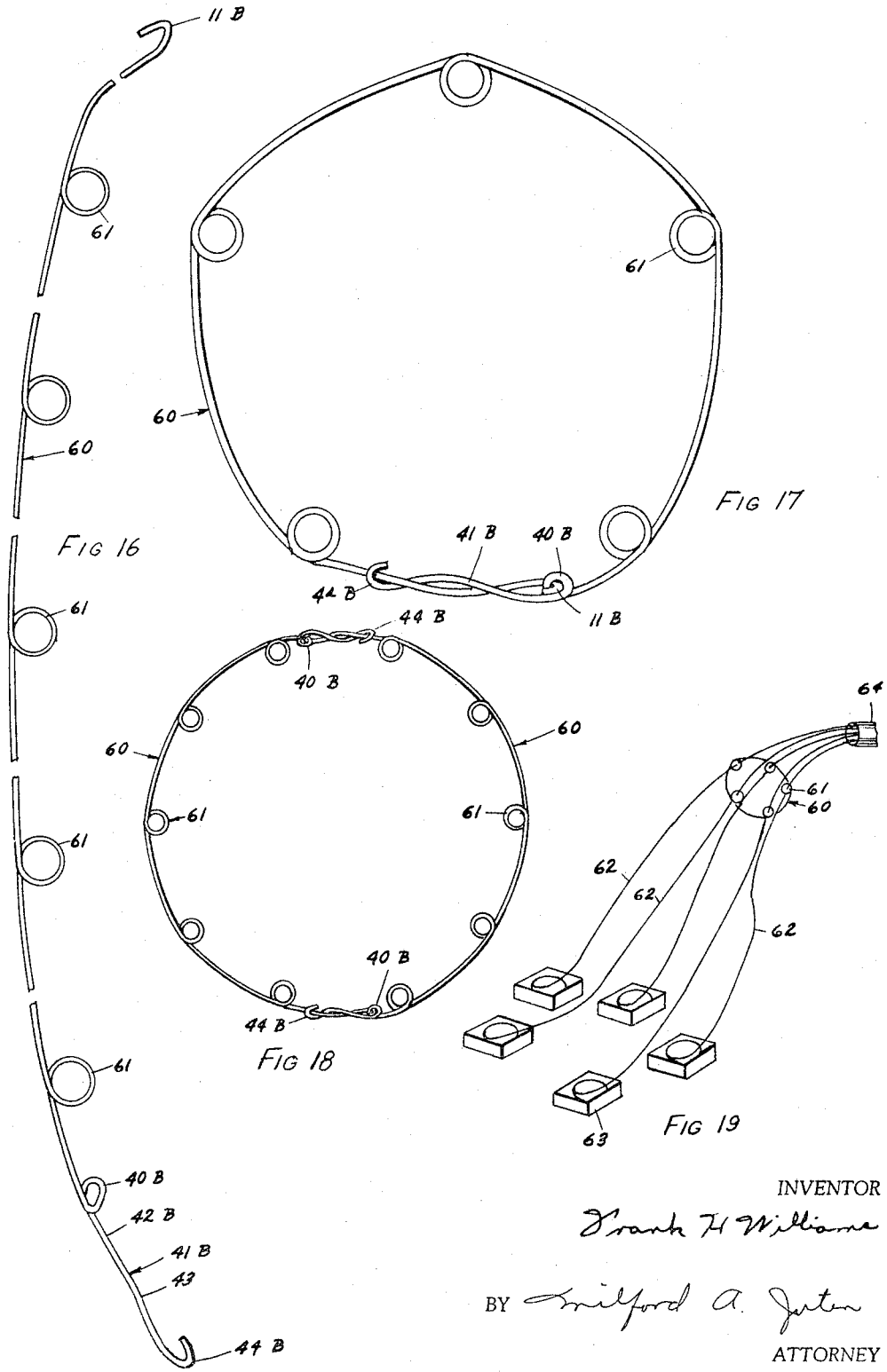

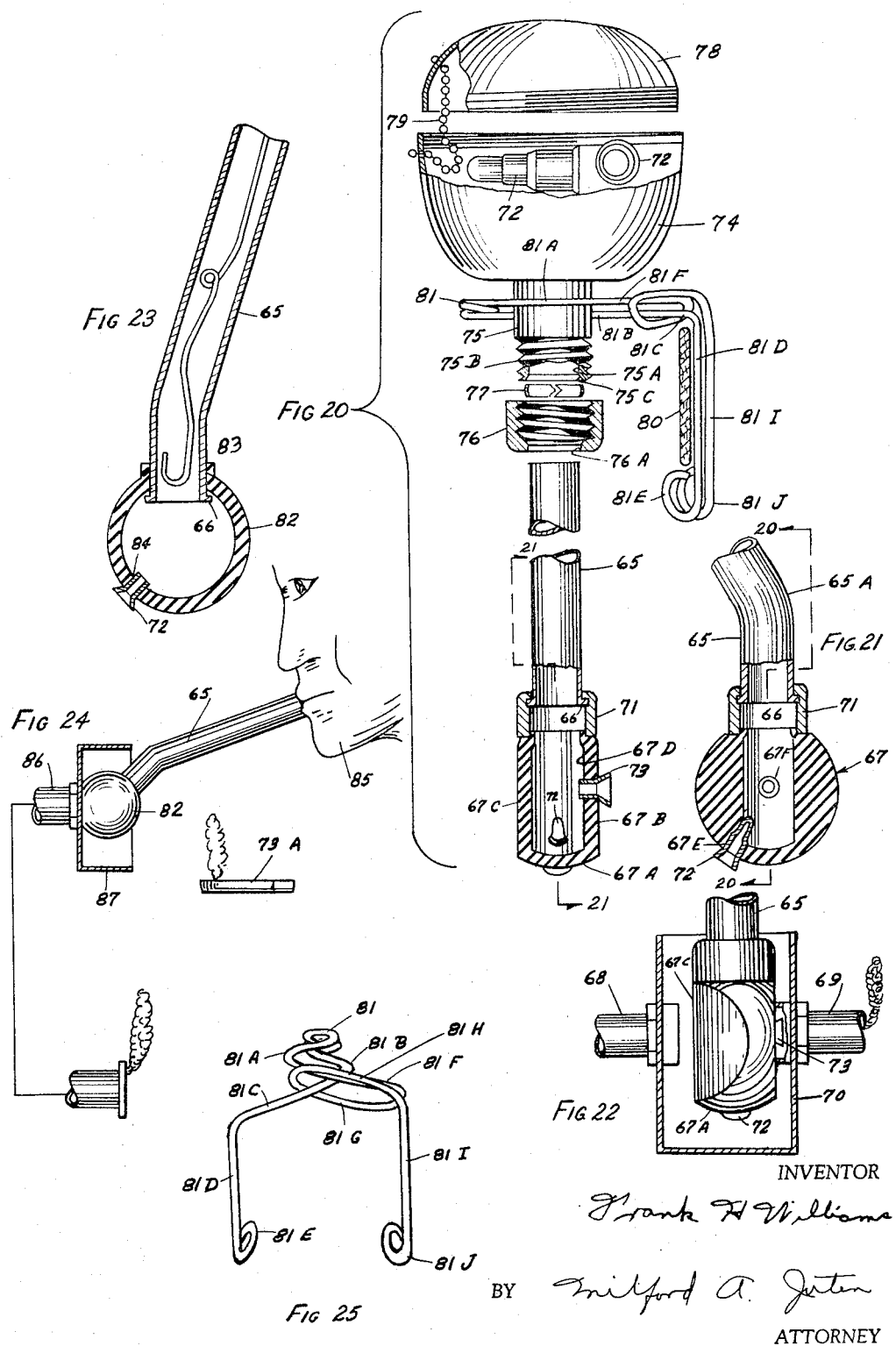

United States Patent Office 3,479,013
Patented Nov. 18, 1969

3,479,013
CONNECTOR MEANS FOR FISH TAPES OR THE LIKE
Frank H. Williams, Little Rock, Ark., assignor of one-third to Milford A. Juten, Washington, D.C.
Original application Nov. 21, 1962, Ser. No. 239,182, now Patent No. 3,224,732, dated Dec. 21, 1965. Divided and this application Sept. 15, 1965, Ser. No. 508,178
Int. Cl. B66c 23/62
U.S. Cl. 254—134.3                14 Claims

ABSTRACT OF THE DISCLOSURE

A device for connecting two ends of wires and particularly fish tapes in which the one wire is provided with a hook and the other wire is provided with a hook at its end and an eye spaced from the hook so that the hook of the first wire may extend into the eye of the other wire and the other wire may be wrapped around the first wire with its hook engaging the shank, thereby providing a connection between the two wires and such connection is particularly useful to connect a device having a plurality of additional hooks for engaging the hook of a third wire particularly where the third wire is a fish tape of the type conventionally used in electrical work for drawing electric wires through a conduit.

---

The present application is a division of application Ser. No. 239,182, filed Nov. 21, 1962 which resulted in Patent No. 3,224,732 issued on Dec. 21, 1965 which is a continuation-in-part of application Ser. No. 112,658, filed May 25, 1961, now abandoned.

The present invention relates to equipment for assisting an electrician in installing wires in conduits, and particularly to the actual drawing of the wires into and through the conduits to connection boxes.

Heretofore it has been customary for electricians to use conventional snake or fish tape of relatively stiff resilient material having a hook bent on the end. Such a fish tape was pushed through a conduit to a connection box at which wires were secured to the hook and the wires drawn back through the conduit. Sometimes the conduit is so long or has so many bends that a fish tape cannot be pushed from one end to the other and it has been necessary to push a second fish tape from the other end and try to cause the hooks of the fish tapes to interengage so that pushing on one fish tape and pulling on the other will bring the end of one fish tape completely through. The wires are then attached to the hook of the one fish tape and drawn through the conduit by the pulling on the said one fish tape.

The problem of connecting the hooks of the two fish tapes in the conduit has been extremely difficult and has been largely a matter of chance that a connection would be made. Also fish tapes have been of excessive length and when one was broken it was necessary to get a new one. It has been difficult to guide several wires uniformly into a conduit without crossing of the wires and in some circumstances the wires could not be pulled through the conduits due to crossing of the wires. Also it has been difficult to carry the equipment and electrical connectors in low crawl spaces.

An object of the present invention is to overcome the problems enumerated above by providing equipment which can be used with present fish tapes for effectively accomplishing the work of installing wires in conduits with a minimum of labor and minimum cost and with a minimum of upsetting experiences due to failures.

An object of the present invention is to provide a connector attachment for a snake or fish tape whereby a first snake can be inserted as far as possible from one end and a second snake can be inserted from the other end and the adjacent portions of the snakes connected so that pulling on one snake while pushing on the other, the pushed snake will pass through the conduit and can be connected to a wire to be installed in the conduit, the wire being drawn through the conduit as the snake to which it is attached is withdrawn.

Another object is to provide a leader for a snake that will assist in guiding the hook end of a snake through a conduit in a pushing direction.

A further object is to provide a method of using snakes to assure that a wire can be installed in any conduit with a minimum of effort.

Another object is to provide means to connect two or more fish tapes both inside of a conduit or prior to insertion in a conduit thereby making it possible to use fish tapes of shorter lengths with attendant convenience and reduction of labor.

Other and further objects will be apparent as the description proceeds and upon reference to the accompanying drawing wherein:

FIGS. 9 and 10 are bottom and side views of a connector on the hook end of a fish tape with the eye of the connector formed of a left handed helix.

FIGS. 11 and 12 are top and side views of wire lead puller for attachment to the hook end of a fish tape with the eye formed by a right hand helix.

FIG. 13 illustrates the use of the wire lead puller as it projects from a conduit at a connection box with the hook end of the fish tape within the conduit.

FIGS. 14 and 15 are top and side views of the coupling for two short fish tapes to provide a long fish tape.

FIG. 16 is a plan view with parts broken away showing the wire guide in condition for carrying and packaging.

FIG. 17 is a plan view of the wire guide of FIG. 16 in operative condition with the ends connected together by the interconnecting structure of the invention.

FIG. 18 illustrates on a smaller scale two of the wire guides of the type shown in FIGS. 16 and 17 connected to guide twice as many wires.

FIG. 19 illustrates how the wire guide is employed to guide a plurality of wires from the wire packages in non crossing and generally parallel relation into a conduit.

Figure 1:
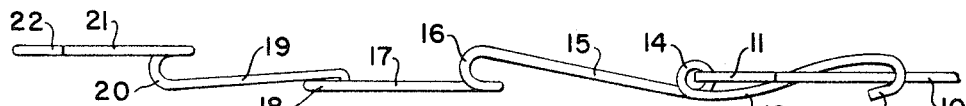
FIG. 1 is a top view of a connecting attachment to a snake or fish tape showing the detachable connection for the shank of the attachment including the eye on the shank of the attachment receiving the hook of the snake and a hook at the free end of the shank holding the shank wrapped around the snake.
Figure 2:
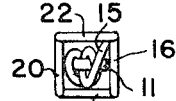
FIG. 2 is an end view of the free end of the connector attachment.
Figure 3:
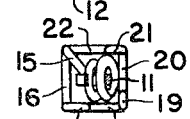
FIG. 3 is an end view of the shank end of the connector attachment.
Figure 4:
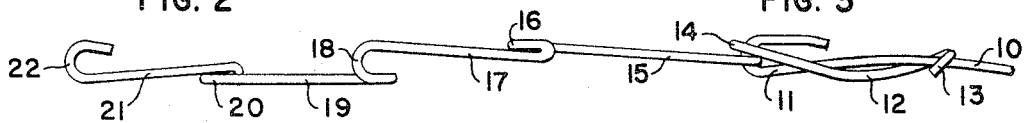
FIG. 4 is a side view of the structure of FIG. 1.
Figure 5:
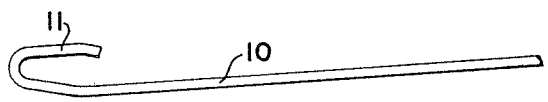
FIG. 5 is a side view of the hook end of a snake.
Figure 6:
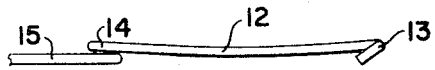
FIG. 6 is a side view of the shank portion of the connector attachment prior to mounting on the snake showing the manner in which the spring wire is bent.
Figure 7:
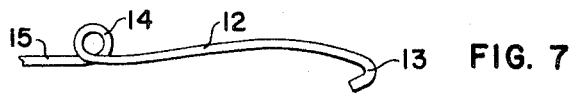
FIG. 7 is a top view of the shank structure of FIG. 6.

The invention according to the modification of FIGS. 1 to 8 provides for a connector attachment to a conventional snake or fish tape 10 having a hook 11 at one end to which the connector attachment, which also serves as a leader, is attached by its shank 12. The shank 12 includes a hook 13 at its free end and an eye 14 formed by a 540 degree bend snuggly receiving the bight of the hook 11 of the snake. The wire is forming the connector extends from the eye 14 to an integral hook shank 15 of a first hook 16, and continuing from the first hook the wire is bent on itself forming a second hook shank 17 of a second hook 18. From the second hook 18 the wire is bent back on itself forming a shank 19 of a third hook 20, the wire being bent back on itself from the third hook 20 forming the shank 21 of a fourth hook 22 completing the connector attachment.

It will be noted that the connector attachment is secured to the snake by first passing the hook 11 of the snake 10 through the eye 14 and then wrapping the shank 12 around the shank body of the snake 11, thereafter causing engagement of the hook 13 of the shank around the snake 10 against the tension or bias of the compound bends in the spring wire of the shank 12 securely attaching the connector attachment to the snake 10. The attachment is preferably made of spring wire that is resilient; the stiffness of the wire is preferably less than the stiffness of the snake to which it is attached, so that the connector serves as a leader to guide the hook end of the snake smoothly into bends in the conduit, which evidently lessen local pressures on the snake. In any case, it appears easier to push a snake equipped with the connector attachment of the present invention into and through a conduit than to insert a conventional snake, It will also be noted that the short leg or point of each hook is slightly bent toward the axis of the connector so that there is no danger of the points of the hooks hanging up on the ends of pipe sections in the conduit. The snakes are provided with the hook ends in which the point of the hook is slightly bent back toward the body of the snake. Therefore, a snake equipped with the connector of the present invention can be readily pushed or pulled through a conduit with a minimum of danger of positive hooking of the hooks with the interior of the conduit as the projecting point portions are rounded, providing a smooth guiding action over any surface encountered in the conduit.

Figure 8:
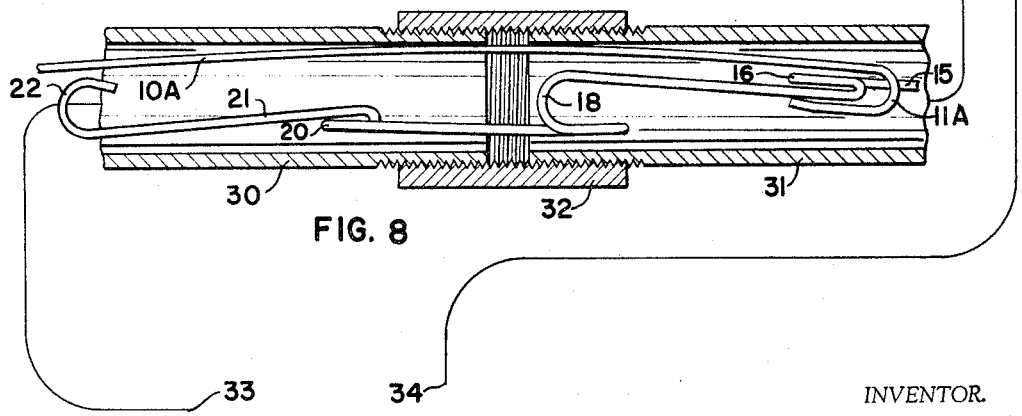
FIG. 8 is an enlarged diagrammatic sectional view of fragments of coupled conduit sections with the connector with its shank and supporting snake within the conduit illustrating how one of the hooks of the connector interengages with the hook of another snake and showing by single line a conduit with many bends.

Upon reference to FIG. 8, a conduit section 30 is connected to a conduit 31 by a coupling 32 in the usual manner and it is assumed that a first snake 10A has been pushed into the conduit assembly from one end 33 as far as possible, which is just beyond the coupling 32, so that its hook 11A is in the location shown in the drawing, for example, and thereafter the connector which is attached to a second snake (not shown in FIG. 8) is inserted through the other end 34 of the conduit assembly until the connector overlaps the hook 11A of the first snake. The second and first snake are relatively novel longitudinally with respect to each other and then the hook 11A engages one of the hooks 16, 18, 20, or 22 in the connector and further pulling on the snakes causes firm engagement. The snakes can then be moved longitudinally by pushing on one snake and pulling on the other until one snake has its end projecting from the end of the conduit assembly opposite the end from which the said one snake was inserted. An electric wire is then attached to the projecting end of the said one snake passing completely through the conduit assembly and the said one snake withdrawn causing the wire to be passed completely through the condut assembly from one end 33 to the other end 34.

Upon reference to FIGS. 9 and 10 a modified form of connector for fish tapes is shown to include an elongated body of resilient material of circular section spring steel wire in which an eye 40 of a size to receive at least one hook 11 of a fish tape 10 is formed by helically bending the steel wire intermediate the ends thereof to provide a shank 41 extending from said eye 40 in one direction generally tangentially to said helical eye 40 and having a first bend 42 spaced from said eye 40 with a curvature opposite to curvature of the eye, and a second bend 43 spaced beyond said first bend from said eye with a curvature in the same direction as said eye. A hook 44 is provided at the extreme end of said shank 41 of a size to receive the body of the fish tape 10. It will be noted that this shank 41 with the eye 40, bends 42 and 43, and hook 44 provide for substantially one and a half turns of the shank 41 including the hook 43 around the body of the fish tape 10 thereby assuring more positive retention of the connector device to the fish tape than that afforded by the modification shown in FIGS. 1 through 8. It will also be noted that in the detached condition the shank assumes a position relative to the non-shank end similar to that shown in FIGS. 11 and 12, for example. The shank 41 as seen from the side in FIG. 12 including hook 43 may appear substantially as a straight line at an acute angle to the axis of the helix of the eye 40 with a bend 45 at the helix showing the acute angle bend 43 as seen from the side may also appear as a bend as shown in FIG. 12, but it should be understood that the shank 41 may appear straight as seen from the side in FIG. 12 from the bend 45. In FIGS. 11 and 12 and FIGS. 1 through 8 the helical eye has a right hand twist while in the other figures the helical eye has a left hand twist. In each instance the shape is such that when the shank is attached to a fish tape the connector assumes axial alignment with the fish tape.

The connector of FIGS. 9 and 10 includes the non-shank multiple J-hook section by which the connector device can be connected to another fish tape 10A in the manner shown in FIG. 8.

From the eye 40 the stem 46A of a first J-shaped hook 46 extends in the opposite direction to shank 41 and generally tangent to the helical eye 40 in a plane substantially peripendicular to the axis of helical eye 40. The wire is bent back on itself along the short leg of J-shaped said wire being hook 46 providing the stem of long leg 47A of a second hook 47 in which the bight of the hook 47 extends at right angles to the bight of the hook 46 and with the stem 47A outwardly of the short leg of the hook 46. Similarly a third J-shaped hook 48 is formed with a stem 48A bent back along the short leg of hook 47 and outwardly thereof forming the stem of long leg 49A of a fourth hook 49 the short leg 49B of which is bent slightly toward the stem 49A and the bight of the hook 49 is at right angles to hooks 48 and 46 and parallel to hook 47 but with the hook 49 opening in the opposite direction to hook 47. The hooks are shown as having their short legs bent toward the shanks, but the short legs can be substantially parallel to the shanks and work satisfactorily under some conditions.

Upon reference to FIG. 13 a wire lead puller 50 is shown attached to a fish tape 10 and partially in a conduit in position to have wires secured to the loop 51 to be drawn into and through the conduit 52 extending to a conventional connection box 53.

The wire lead puller includes an eye 40 intermediate its ends substantially similar to that shown in FIGS. 9 and 10 with the shank 41 and its hook 43 extending in one direction from the helical eye 40 (the helical eye being shown as being formed by a right hand helix).

The lead puller includes an elongated stem or body 54 having a pair of loops 55 and 56 formed in the free end portion thereof with the loops 55 and 56 having a common connecting bight portion 57 spaced from the outer ends of the loops 55 and 56, the free end portion of the elongated body interengaged with the stem 54 by twisting 58 back on the body inwardly of the loops 55 and 56 and then the free end is bent back upon itself forming a hook 59 which engages the common bight portion 57 of loops 55, 56 thereby supporting the loops against collapsing when the electrical wires are attached thereto and pulled in a conduit.

The lead puller as well as the connector devices serves as a guide for the fish tape with which it is used since the wire of the lead puller is less stiff than the material of the fish tape and therefore the lead puller acts as a flexible extension guide starting the end of the fish tape along the curvature of a conduit which has been already passed by the lead puller. It will be apparent that the loops 55 and 56 may be parallel to each other as shown or at right angles to each other and may be parallel or at right angles to the hoop of the fish tape and to the eye 40 of the means for attachment to the fish tape and thereby serve to further guide the fish tape in many irregular and curved portions of a conduit.

In each instance the means for attachment including the eye 40 and the shank 41 with the hooks 43 at the extreme end provides for mounting on any fish tape of a size suitable to be threaded through the eye 40. The interengagement of the shank 41 with the body of the fish tape assures a reduction of strain on the hook 11 of the fish tape and therefore increases the pulling strength of the fish tape before breakage of the hook 11 from the fish tape. Further action of reducing the strain on the hook 11 of the fish tape prevents the hook 11 from spreading within the conduit and prevents the extreme end of the hook from engaging the sides of the conduit even under severe strain encountering in pulling many wires simultaneously through the conduit.

Upon reference to FIGS. 14 and 15 a connector for securing the hooked end of one fish tape 10 to the hooked end of another fish tape 10A is shown and the structure thereof is a duplication of that shown for the means to secure the connector device of FIGS. 9 and 10 to the fish tape 10. It will be noted that the parts on the right are numbered identically to that shown in FIGS. 9 to 12 while the parts on the left are similarly numbered but with a suffix A after the reference numeral to avoid duplication of description. It will be apparent that the eye 40 or 40A is of a size to receive two hooks of similar fish tapes and the structure provides for connecting as many fish tapes as desired thereby making it possible for a mechanic to use short otherwise unusable fish tapes and to obtain the desired length, and also making it possible to avoid carrying a long fish tape for what may be a single long use and many short uses.

The connector of FIGS. 14 and 15 may be used for connecting many different elongated members and is suitable for use as a universal joint for the ends of shafts as the resiliency of the spring wire of which the connection device is made permits substantial flexing and the positive connection by means of the eye 40 and hooks 11 gives a positive driving relation in angular directions about the axes of the elongated members whether such members are fish tapes or rotating shafts or the like. It will be noted that the portion of the attaching shank 41 between the eye 40 and the bend 42 is located adjacent the free end of the hook 11 of the fish tape 10 and due to the fact that the shank 41 is wrapped around the body of the fish tape the eye 40 is urged away from the free end of the hook 11 and toward the main body of the fish tape thereby reducing the eccentric loading on the hook 11 and on the body of the fish tape. The connection devices serve to take the pushing and pulling strain of the fish tapes without adversely affecting the use thereof.

Upon reference to FIGS. 16 to 18 a wire guide 60 is shown made of resilient elongated wire-like material with a plurality of wire guiding eyes 61 intermediate the ends thereof and having hooks 11B and 44B at the ends thereof with the hooks extending generally in opposite directions and corresponding to hook 11 of the fish tape 10 and to the hook 44 on the connector device despectively. A hook receiving eye 40B is provided adjacent the hook 44B with bends 42B and 43B between the hook 44B and eye 40B to provide for the interconnection between the hook end 11B and the shank end 41B. The connection of the ends of the wire guide results in the ring formation shown in FIGS. 17 and 19 and the wire guide can then be used to guide the individual wires 62 from packages 63 to a conduit 64 in parallel relation to assure that the wires do not cross as they are drawn into the conduit.

When more than five wires are to be guided two of the wire devices 60 are connected to form a larger wire guide ring as shown in FIG. 18 and the number can be increased as desired with each wire guide unit being connected to the other by the same connection means.

The wire guide after formation into the ring is used by first threading the wires 62 through the guide eyes 61 from the wire packages 63 and then to a lead puller 50 such as that shown in FIGS. 11 to 13. The ends of the wires are fastened to the lead puller 50 by suitably twisting the wires to the loops 55 and 56 thereof and then one electrician draws the fish tape 10 back through the conduit 64 as the other electrician guides the wires through the wire guide 60 successively moving the wire guide away from the conduit 64 toward the wire package 63 thereby keeping the wires in generally parallel relation as the wires enter and pass through the conduit avoiding crossing of the wires and thereby avoiding any binding.

It will be apparent that vraious changes can be made within the spirit and scope of the present invention as set forth in the valid interpretation of the appended claims.

What is claimed is:

1. A connector for connecting two fish tapes together within a conduit comprising a resilient wire providing an attaching shank having a hook at one end and an eye formed by one turn of approximately 540 degrees spaced from the said hook end of the attaching shank, said hook and the eye each being of a size to snugly receive and engage one fish tape and extending in the same direction from said shank while lying in offset planes in unattached condition, said eye being adapted to be positioned about the bight of a hook of a fish tape, and said shank being adapted to be spirally wrapped about the body of the fish tape making with the attaching hook of the connector substantially more than one complete turn about the body of the fish tape and releasably fixing the connector to the fish tape, said connector including a first J-shaped hook having its long leg or stem extending from said eye opposite the attaching shank and having its short leg converging toward said long leg, said wire being bent back on itself along the short leg to provide the stem or long leg of a second J-shaped hook, the bight of the second J-shaped hook being substantially at right angles to the bight of the first J-shaped hook, the wire being bent back on the short leg of the second J-shaped hook providing the stem or long leg of a third J-shaped hook, said third J-shaped hook lying in a plane at right angles to the first second J-shaped hook and generally parallel to the first J-shaped hook, but with the hook extending in the opposite direction, and the wire being bent back along the short leg of the third J-shaped hook forming the stem or long leg of a fourth J-shaped hook substantially perpendicular to the first and third J-shaped hooks and parallel to the second J-shaped hook but having its hook extending in the opposite direction, to said second J-shaped hook.

2. The invention according to claim 1 in which the short legs of each J-shaped hook is bent inwardly toward its stem or long leg.

3. The combination with a snake having a hook at one end of an elongated connection device of wirelike material of less stiffness than said snake, said connection device having an eye intermediate its ends with the eye receiving the bight portion of the hook of the snake, the shank of the device extending from one side of the eye extending from the inner surface of the snake and around the snake to the outer surface and terminating in a hook extending in the same direction as said eye from said shank with said hook embracing the inner surface of the snake, and means on the other end of the connector device for securing a similar snake thereto.

4. The combination of a snake having a hook including a bight portion at one end with said hook having its free end bent back toward the shank of the snake, of a resilient elongated device having a closed loop intermediate its ends with said loop being received on the hook of said snake at the bight portion of the hook thereof, said device having a hook at one end of a size to engage the shank of said snake for approximately 180 degrees with the portion of the device between said loop and said hook of said device at one end engaging over 180 degrees of the shank of said snake so that said portion of said device and said hook of said device at one end engages over 360 degrees of the shank of the snake assuring complete connection to said snake, said device having a plurality of hooks arranged in longitudinally and circumferentially spaced relation to assure that when a snake equipped with said device is inserted in a conduit to which a conventional snake is located the hook of the conventional snake will be engaged with one of the hooks of the device.

5. The combination of a snake having a hook including a bight portion at one end with said hook having its free end bent back toward the shank of the snake, of an elongated device having a closed loop intermediate its ends with said loop being received on the hook of said snake at the bight portion thereof, said device having a hook at one end of a size to engage the shank of said snake with approximately 180 degrees with the part of the device between said loop and said hook at one end of said device engaging the shank of said snake over 180 degrees so that said part of said device and said hook at one end of said device engages over 360 degrees of the shank of the snake assuring complete connection to said snake, said device having a plurality of hooks arranged in longitudinally and circumferentially spaced relation with the plane of each last mentioned hook being parallel to the length of said device and transverse to a radius thereof to assure that when a snake equipped with said device is inserted in a conduit in which a conventional snake is located the hook of the conventional snake will be engaged with one of the plurality of hooks of the device.

6. A device for connecting the ends of first and second snakes inserted into a conduit from opposite ends, each of said ends of said snakes having a hook defined by a bight portion between the point end of the hook and the snake body, said device comprising an elongated stiff resilient wirelike member having a shank at one end for mounting on the hook end of said first snake, said shank further including a small hook at one end and an eye spaced from said small hook for receiving the bight portion of the hook of said first snake, the intermediate portion of the shank between said eye and said small hook being wrapped around the body of said first snake forming a resilient, releasable connection therebetween, and a plurality of hooks formed on said wirelike member spaced from said shank, said last mentioned hooks being longitudinally spaced and being located in different planes to thereby engage the hook end of said second snake when said ends of said snakes meet in said conduit.

7. A connector for connecting two fish tapes so one fish tape can be pulled while the other is pushed comprising an elongated body of resilient wire, an eye intermediate the length of said body with its axis transverse to the length of said body, said eye being of a size to receive at least one hook of a fish tape, a first shank extending from said eye, said first shank including a first portion extending transversely to the axis of said eye, a serpentine bend in said first shank spaced from said eye to embrace a fish tape, a hook spaced from said bend of a size to receive the body of the fish and open in the direction of the eye, and means on the portion of said connector spaced from said first mentioned hook in the opposite direction from said eye for attachment to a second fish tape.

8. The invention according to claim 7 in which the eye is a helix formed by the wire.

9. The invention according to claim 7 in which the means on the portion of said connector spaced in the opposite direction with respect to said eye from said first mentioned hook of said connector for attachment to a second fish tape includes a second shank of said wire extending from said eye, said second shank of said wire having a serpentine bend spaced from said eye and a second hook spaced from the serpentine bend of its shank and open in the direction of said eye for connection to another fish tape.

10. A connector for connecting two rod sections having hooks on their adjacent ends in end-to-end relation comprising an elongated body of resilient wire, an eye intermediate the length thereof with its axis tranverse to the length of the body, said eye being of a size to receive both hooks of the rod sections, a shank extending in each direction from said eye, each shank including a first portion extending transversely to the axis of said eye, a serpentine bend in each shank spaced from said eye to embrace the adjacent rod section, and a hook on each shank spaced from its bend of a size to receive the rod section and open in the direction of the eye whereby when force is applied to one rod section connected by said connector to another rod section the force will be transferred to said another rod section.

11. A connector structure for releasably connecting one elongated end of stiff resilient wire-like material to another elongated end of resilient wire-like material, the free extremity of each end having a hook formed thereon, the said one elongated end including a stem portion, the said another elongated end forming a shank and having an eye spaced from its free extremity, the axis of the eye being tranverse to the shank, said eye being of a size to receive at least the hook of said one end, said shank including a first portion extending transversely to the axis of said eye, a serpentine bend in said shank between said eye and the free extremity of said shank to embrace the stem portion of the said one end, the hook on the free extremity of said another end being of a size to receive the stem portion of said one end, said hook on said free extremity of said shank being open in the direction of said stem whereby said one end can be releasably connected to said another end.

12. The invention according to claim 11 in which said one end is the hook end of a fish tape.

13. The invention according to claim 11 in which the said one end and the another end are opposite ends of a single wire whereby when the said one end and the said another end are connected together a closed loop is formed.

14. The invention according to claim 13 in which wire guiding eyes are formed in said single wire.

References Cited
UNITED STATES PATENTS

| | | | |
|---|---|---|---|
| 130,519 | 8/1872 | McComb | 24—27 |
| 496,768 | 5/1893 | Baughman | 24—139.1 |
| 925,484 | 6/1909 | Knoble | 24—27 |
| 911,583 | 2/1909 | Focht. | |
| 1,157,747 | 10/1915 | Winter | 24—139.1 |
| 1,592,357 | 7/1926 | Harden | 15—104 |
| 1,658,887 | 2/1928 | Dotzauer | 254—134 |
| 3,041,043 | 6/1962 | Harden | 254—134 |

OTHELL M. SIMPSON, Primary Examiner